C. D. FRAUNFELTER.
COOKING UTENSIL.
APPLICATION FILED JAN. 19, 1912.
1,055,526.
Patented Mar. 11, 1913.
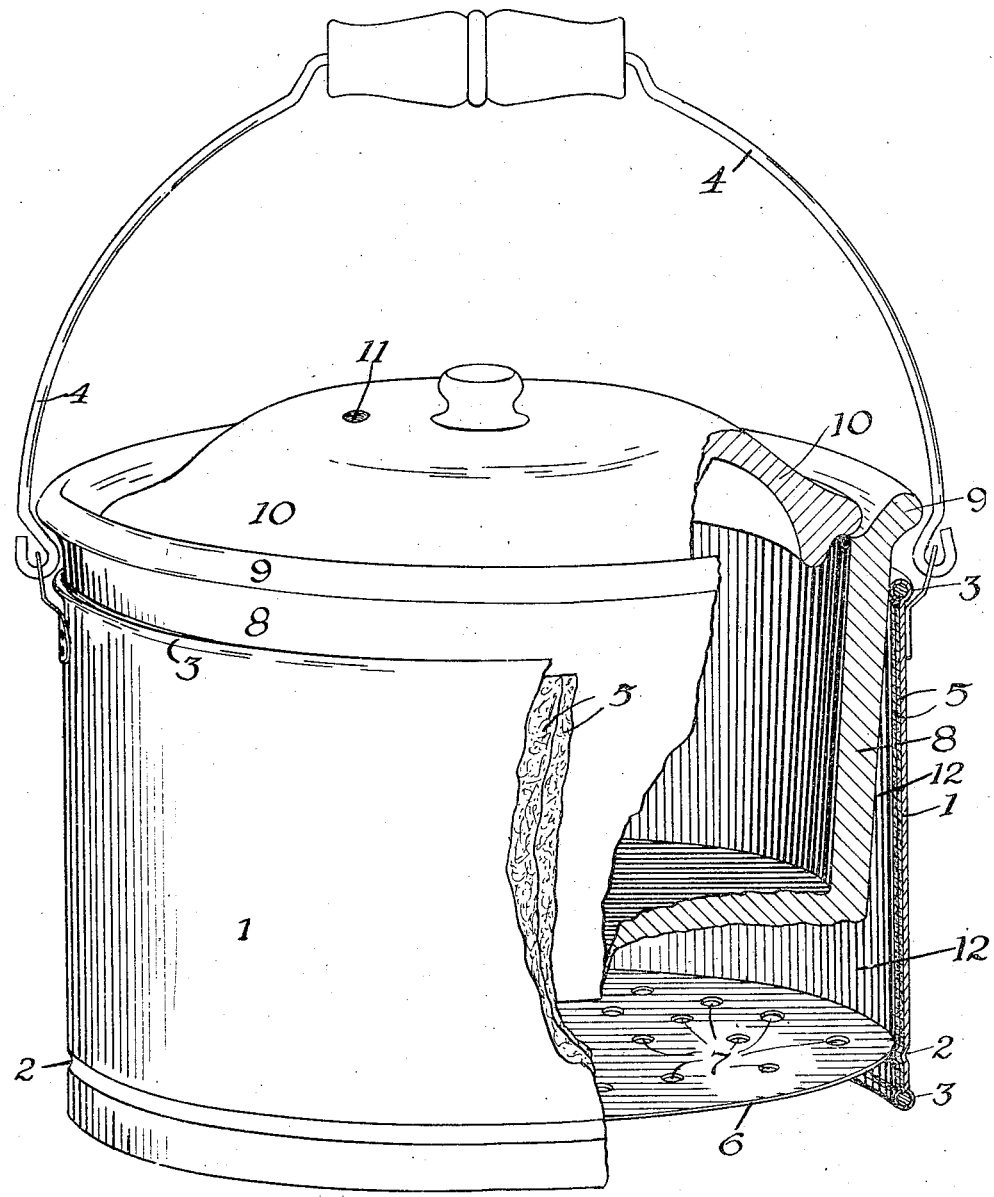
Witnesses
J. E. Titus
B. G. Richards
Charles D. Fraunfelter, Inventor
By Joshua R. H. Potts
His Attorney

UNITED STATES PATENT OFFICE.

CHARLES DAVIES FRAUNFELTER, OF ZANESVILLE, OHIO.

COOKING UTENSIL.

1,055,526.  Specification of Letters Patent.  Patented Mar. 11, 1913.

Application filed January 19, 1912. Serial No. 672,207.

*To all whom it may concern:*

Be it known that I, CHARLES D. FRAUNFELTER, a citizen of the United States, and a resident of the city of Zanesville, county of Muskingum, and State of Ohio, have invented certain new and useful Improvements in Cooking Utensils, of which the following is a specification.

My invention relates to improvements in cooking utensils and has for its object the provision of a cooking utensil of improved construction and operation and especially adapted for use in fireless cookers.

The invention consists in the combinations and arrangements of parts hereinafter described and claimed.

The invention will be best understood by reference to the accompanying drawing forming a part of this specification, and which is a perspective view, with portions broken away and shown in section, of a cooking utensil embodying my invention.

The preferred form of construction as illustrated in the drawing comprises an outer cylindrical metallic shell 1 having an inwardly extending supporting bead 2 situated a short distance above the lower edge, and reinforcing beads 3 arranged at its upper and lower edges. Shell 1 is provided with a lifting bail 4 of ordinary construction and is lined with double layers of asbestos paper 5, as shown. A bottom 6 is provided with n :merous perforations or other foraminations 7 and is loosely inserted in shell 1 to be supported by bead 2 as shown.

An inner food containing vessel 8 is made of earthen ware, pottery, porcelain or other ceramic material and fitted within shell 1, as shown. Vessel 8 is made downwardly tapering in form and is provided with an outwardly extending lip 9 at its upper edge which will limit the extent of insertion of said vessel in shell 1. Vessel 8 is provided with a removable lid or cover 10 made out of the same material as said vessel. Lid 10 is provided with a perforation 11 to permit the escape of steam from said vessel during cooking. Vessel 8 and lid 10 are glazed on the inner, but not outer sides. It will be observed that the depth of vessel 8 and its insertion into shell 1 is such that a hot air chamber 12 is formed under and around vessel 8. Said vessel and cover are made of the same material and of a substantially uniform thickness, being made thick enough to cause the walls and cover to constitute radiators, and thus dispense with the use of the usual radiators employed in fireless cookers. The air chamber under and around vessel 8 insures uniform and gradual application of the heat thereto so that said vessel will not crack or burst during the cooking operation, and the perforated bottom 6 insures a uniform distribution of the heat and consequently uniform heating of air chamber 12. The asbestos lining sheets 5 serve to prevent loss of heat by radiation.

The cooking utensil set forth will be found to be highly efficient in use and especially adapted for use in fireless cookers.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A cooking utensil comprising an outer cylindrical metallic shell having an inwardly extending bead situated above the bottom edge thereof; an asbestos lining for said outer shell; a foraminated bottom supported by said bead; and an inner downwardly tapering ceramic ware vessel fitting within said shell and supported thereby, substantially as described.

2. An article of manufacture comprising an outer cylinder open at both ends; reinforcing means formed at the ends of said cylinder; an inwardly extending supporting bead formed in the body of the cylinder adjacent to and spaced from the lower edge thereof; a plurality of sheets of asbestos mounted upon the interior of said cylinder and adapted to conform with the contour thereof, accommodating the supporting bead aforesaid; an apertured plate arranged upon by said bead; and an inner downwardly said supporting bead; and an inner vessel mounted in the upper end of said cylinder having the bottom thereof spaced from the plate.

In testimony whereof I have signed my name to this specification in the presence of two subscribing witnesses.

CHARLES DAVIES FRAUNFELTER.

Witnesses:
F. W. GARGES,
M. C. FANNER.